United States Patent [19]

Takahashi et al.

[11] Patent Number: 4,748,522
[45] Date of Patent: May 31, 1988

[54] MAGNETIC HEAD ASSEMBLY HAVING VIBRATION CONTROLLING MEMBER

[75] Inventors: Atsushi Takahashi; Atsushi Iwanaga; Osamu Hatakeyama, all of Furukawa, Japan

[73] Assignee: Alps Electric Co., Ltd., Japan

[21] Appl. No.: 920,842

[22] Filed: Oct. 17, 1986

[30] Foreign Application Priority Data

Oct. 19, 1985 [JP] Japan .......................... 60-159255[U]

[51] Int. Cl.$^4$ ......................... G11B 5/54; G11B 21/20; G11B 21/22
[52] U.S. Cl. .................................... 360/104; 360/105
[58] Field of Search ................................. 360/105, 104

[56] References Cited

U.S. PATENT DOCUMENTS 4,347,535 8/1982 Dalziel ................................. 360/104

FOREIGN PATENT DOCUMENTS 55-18654 9/1981 Japan .................................... 360/104

Primary Examiner—Robert S. Tupper
Attorney, Agent, or Firm—Guy W. Shoup

[57] ABSTRACT

Disclosed herein a magnetic head assembly including a carriage to which a magnetic head is mounted, a leaf hinge spring fixed to said carriage at an end portion thereof and an arm rotatably connected through said leaf hinge spring to said carriage. The improvement comprises a fulcrum portion projecting from said carriage and adapted to abut against one side of said arm, and an elastic member interposed between a part of said carriage opposed to said fulcrum portion and the other side of said arm, wherein said arm is supported by said fulcrum portion and said elastic member.

3 Claims, 3 Drawing Sheets

MAGNETIC HEAD ASSEMBLY HAVING VIBRATION CONTROLLING MEMBER

BACKGROUND OF THE INVENTION

The present invention relates to a magnetic head assembly to be used in a floppy disc drive or the like, and more particularly to a magnetic head assembly having an arm rotatably supported to a carriage.

There will be described a conventional magnetic head assembly with reference to FIGS. 6 to 8. FIG. 6 is a sectional view of the magnetic head asembly. FIG. 7 is a plan view of an essential part showing a hinge portion between an arm and a carriage. FIG. 8 is a sectional view of the hinge portion. In FIGS. 7 and 8, some parts are omitted for the purpose of avoiding complicatedness.

Referring to these figures, the magnetic head assembly is mainly constituted of a carriage 20, an arm 21 and a leaf hinge spring 22, and is designed to be moved in a radial direction of a magnetic disc 24 along a guide shaft 23 by means of a pulse motor (not shown).

The carriage 20 includes a base material 25 therefor made of insulating synthetic resin, a head holder 26 mounted to a front end portion of the base material 25, a lower magnetic head 27 mounted to the head holder 26, a lead wire 28 derived from the lower magnetic head 27 and connected through a junction terminal 29 to an external lead wire 30, and a spacer 33 arranged on a rear end portion of the base material 25 and formed with push portions 34 projecting from a front end on both sides thereof, whereby recesses 35 are defined between the push portions 34 and the base material 25. Reference numerals 31 and 32 designate solders and adhesives for fixing the lead wire 30.

The arm 21 includes a base material 36 therefor made of insulating synthetic resin, a gimbal 37 of metallic spring thin plate mounted to a front end of the base material 36, an upper magnetic head supported to the gimbal 37, and a lead wire 39 derived from the upper magnetic head 38 and connected with a flexible print substrate 40 by means of the solder 31. The flexible print substrate 40 is connected with an external lead wire 41. The external lead wire 41 is fixed by the adhesives 32 at plural positions. The base material 36 is formed with substantially columnar support portions 42 at a rear end on both sides thereof. The support portions 42 have respective arcuately expanded portions 42a (See FIG. 8) inserted into the recesses 35 of the carriage 20 in such a manner as to directly abut against an upper surface of the base material 25 and be opposed to a lower surface of the push portions 34 with a small gap defined therebetween. Reference numeral 43 designates a lifting projection for upwardly moving the arm 21 which projection is provided on one side of the front end portion of the base material 36.

The leaf hinge spring 22 is formed of a metallic single plate such as a phosphor bronze plate or a stainless plate. One end of the leaf hinge spring 22 is embedded in the rear end portion at the center of the base material 36 of the arm 21, that is, in a part interposed between the pair of support portions 42 (See FIG. 7), while the other end is fixed through a fixture 44 to the carriage 20 by means of a screw 45. Reference numeral 46 designates a lock member for locking the screw 45. Reference numeral 47 designates a compression spring interposed between the fixture 44 and the base material 36 of the arm 21. The compression spring 47 acts to normally bias the arm 21 toward the carriage 20 side.

In operation, when the magnetic disc 24 is under an uninserted condition, the lifting projection 43 of the arm 21 is lifted by a lifting means (not shown) and rotated about the pair of support portions 42 to be restricted at a moving position as shown by an arrow in FIG. 6, wherein the upper magnetic head 38 is separated from the lower magnetic head 27 by a predetermined distance. When the magnetic disc 24 is inserted into the magnetic head assembly and then clamped, the restricted condition where the arm 21 is lifted by the lifting means is released in cooperation with the clamping, and the arm 21 is lowered by a resilient force of the compression spring 47. Then, the magnetic disc 24 is held by both the magnetic heads 27 and 38 to thereby permit reading and writing of information. In the holding operation of the magnetic disc 24, a relative positional relation between both the magnetic heads 27 and 38 is retained by the leaf hinge spring 22.

At the base portion of the arm 21, the arcuate portions 42a of the support portions 42 as a fulcrum are smoothly brought into contact with the carriage 20 to perform a hinging function on both sides of the leaf hinge spring 22. In the event that the arm 21 is rapidly lifted, the support portions 42 abuts against the push portions 34 so as not to generate an excess bending stress in the leaf hinge spring 22.

There are defined gaps A between the push portions 34 of the spacer 33 and the support portions 42 of the arm 21 so as not to restrict the rotation of the arm 21 upon lifting of same. Further, the gaps A function as a recess upon mounting of the arm 21 to the carriage 20 so that the upper magnetic head 38 mounted to the arm 21 may not abut against the lower magnetic head 27 mounted to the head holder 26 upon assembling.

However, in the aforementioned conventional device, existence of the gaps A causes oscillation of the arm 21 owing to external oscillation. As a result, the arm 21 is unexpectedly oscillated during recording and reproducing to generate off-track which has base influence upon recording and reproducing characteristics. Further, the gimbal 37 and the arm 21 are simultaneously oscillated because of sliding between the upper magnetic head 38 and the magnetic disc 24. Such oscillation causes generation of audible sound or socalled head noise.

SUMMARY OF THE INVENTION

Accordingly, it is an object of the present invention to provide a magentic head assembly which may prevent off-track due to external oscillation during reading and writing of information to the magnetic disc thereby to obtain good reading and writing characteristics.

It is another object of the present invention to provide a magnetic head assembly which may prevent head noise due to resonance of the arm during rotation of the magnetic disc.

According to the present invention, in a magnetic head assembly including a carriage to which a magnetic head is mounted, a leaf hinge spring fixed to the carriage at an end portion thereof and an arm rotatably connected through the leaf hinge spring to the carriage, the improvement comprises a fulcrum portion projecting from the carriage and adapted to abut against one side of the arm, and an elastic member interposed between a part of the carriage opposed to the fulcrum portion and the other side of the arm, wherein the arm is supported by the fulcrum portion and the elastic member.

The invention will be more fully understood from the following detailed description and appended claims when taken with the drawings.

DETAILED DESCRIPTION OF THE PREFERRED EMBODIMENTS

Figure 1:
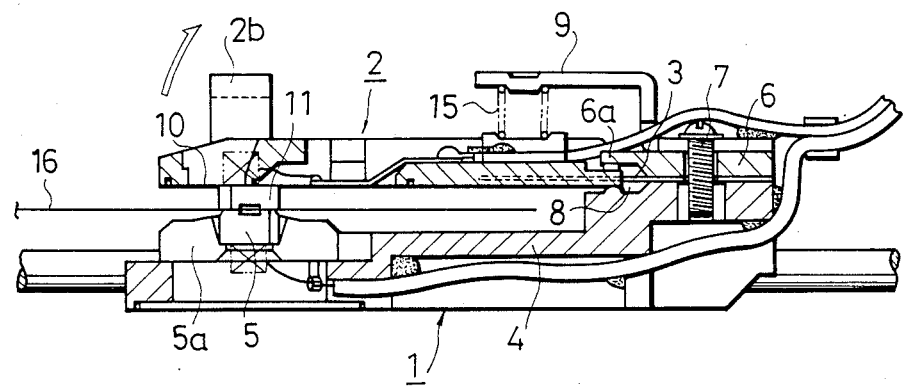
FIG. 1 is a partially sectional side view of the magentic head assembly of a first preferred embodiment according to the present invention.
Figure 2:
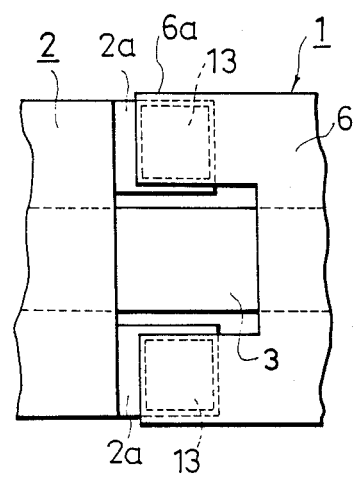
FIG. 2 is a plan view of an essential part in FIG. 1.
Figure 3:
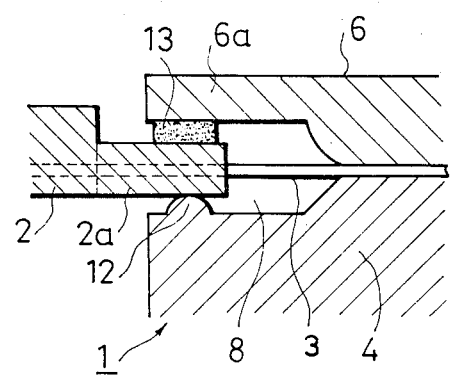
FIG. 3 is an enlarged vertical sectional view of the essential part in FIG. 1.

Referring to FIGS. 1 to 3, the magnetic head assembly is mainly constituted of a carriage 1, an arm 2 and a leaf hinge spring 3 for rotatably connecting the arm 2 to the carriage 1. The carriage 1 mainly includes a base material 4 made of insulating synthetic resin. A lower magnetic head 5 is mounted to a head holder 5a at a front end portion of the base material 4. A spacer 6 is fixed onto a rear end portion of the base material 4 by means of a screw 7, and there are defined recesses 8 between front end portions 6a of the spacer 6 and the base material 4.

The leaf hinge spring 3 is formed of a metallic single plate such a a phosphor bronze or a stainless steel plate, and is arranged between the spacer 6 and the substrate 4 in such a manner that one end of the leaf hinge spring 3 is embedded in the rear end portion at the center of the arm 2, that is, in a part interposed between a pair of support portions 2a (SEE FIG. 2), while the other end is fixed through a fixture 9 to the base material 4 of the carriage 1 by means of the screw 7.

The arm 2 is made of insulating synthetic resin, and is provided with a gimbal 10 formed of a metallic spring thin plate at the front end thereof. An upper magnetic head 11 is supported by the gimbal 10.

A pair of fulcrum portions 12 are projected from the base material 4 of the carriage 1 in the recesses 8 in such a manner that an upper surface of the fulcrum portions 12 is arcuate in section. A lower surface of the rear end portions of the arm 2 is in contact with the fulcrum portions 12, while an upper surface of the rear end portions of the arm 2 is in elastic contact with a pair of elastic members 13 such as sponge or rubber material provided at the front end portions 6a of the spacer 6 in opposed relation with the fulcrum portions 12. Accordingly, the rear end portions of the arm 2 are elastically retained by the elastic members 13 and rotatably supported to the carriage 1 by the fulcrum portions 12.

The fixture 9 is formed in a crank-like shape as viewed in side elevation, and is fixed onto the spacer 6 by the screw 7 at the rear end portion thereof. A compression spring 15 is interposed between the fixture 9 and an upper portion of the arm 2 so as to normally bias the arm 2 toward the base material 4 of the carriage 1.

In operation, when a magnetic disc 16 is under an uninserted condition, a lifting projection 2b of the arm 2 is lifted, and the pair of support portions 2a of the arm 2 deform the elastic members 13 to be rotated about the fulcurm portions 12. Thus, the arm 2 is restricted at a moving position as shown by an arrow in FIG. 1, and the upper magnetic head 11 is separated from the lower magnetic head 5 by a predetermined distance. When the magnetic disc 16 is inserted into the magnetic head assembly and then clamped, the restricted condition where the arm 2 is lifted is released in cooperation with the clamping, and the arm 2 is lowered by a resilient force of the compression spring 15. Then, the magnetic disc 16 is held by both the magnetic heads 5 and 11 to thereby permit reading and writing of information.

In the holding operation of the magnetic disc 16, a relative positional relation between both the magnetic heads 5 and 11 is reatined by the leaf hinge spring 3 in the same manner as in the prior art.

As is mentioned above, the rear end portions of the arm 2 are in contact with the arcuate surface of the fulcrum portions 12 of the carriage 1 to thereby permit smooth rotation of the arm 2. Even in the event that any external oscillation is applied to the carriage 1, unexpected movement may be hindered because the rear end portions of the arm 2 is retained by the elastic members 13. Further, since the external oscillation is absorbed by the elastic members 13, large oscillation may be prevented from being applied to the arm 2. Accordingly, it is possible to prevent generation of off-track of the magnetic head to the magnetic disc during reading and writing of information and thereby obtain good reading and writing characteristics. Moreover, resonance of the arm 2 due to sliding between the upper magnetic head 11 and the magnetic disc 16 may be absorbed by the elastic members 13, and such resonance may be relased to the carriage 1 side having greater mass because the arm 2 is elastically abutted against the fulcrum portions 12 of the carriage 1. As a result, it is possible to prevent head noise due to the resonance of the arm 2.

The elastic members 13 may include elastic materials such as coil spring or leaf spring is substitution for sponge or rubber material.

Figure 4:
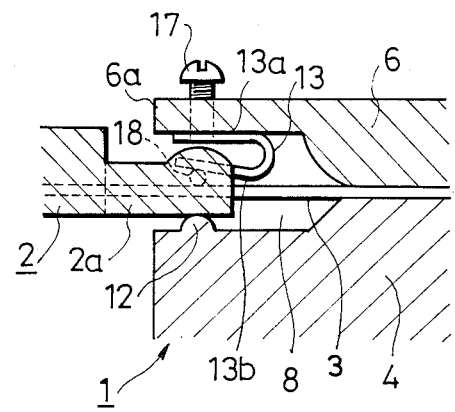
FIG. 4 is a vertical sectional view of the essential part of a second preferred embodiment according to the present invention.
Figure 5:
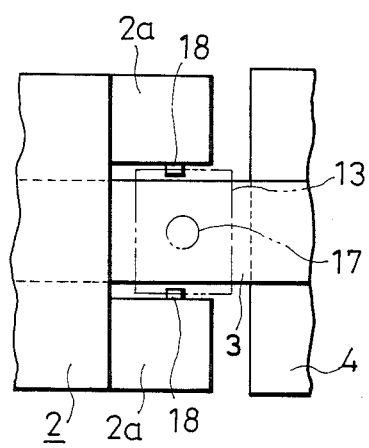
FIG. 5 is a plan view of the essential part of the second preferred embodiment.
Figure 6:
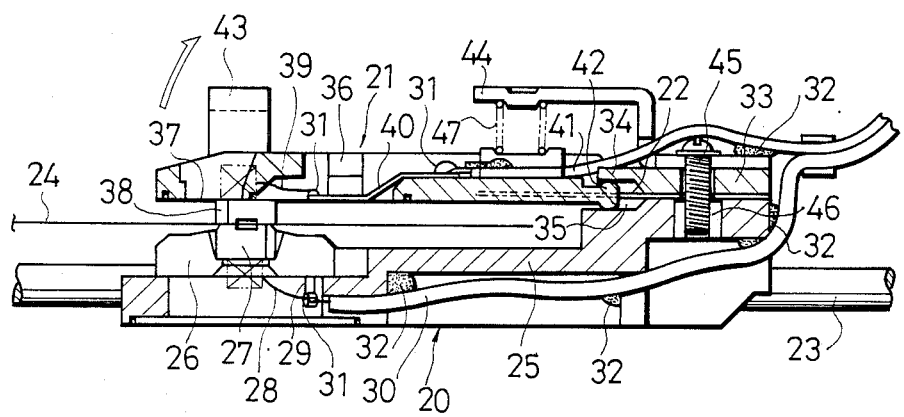
FIG. 6 is a sectional side view of the magnetic head assembly in the prior art.
Figure 7:
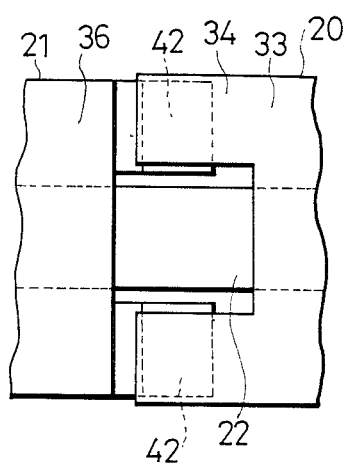
FIG. 7 is a plan view of the essential part in FIG. 6.
Figure 8:
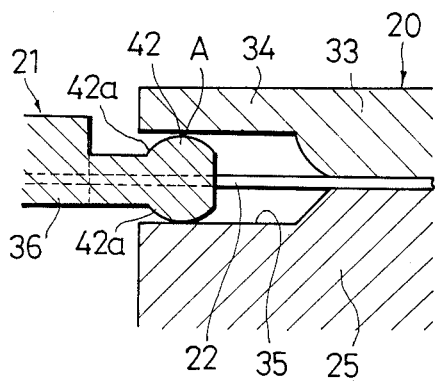
FIG. 8 is an enlarged vertical sectional view of the essential part in FIG. 6.

Referring next to FIGS. 4 and 5 which show a second preferred embodiment using a leaf spring formed in U-shape as viewed in side elevation for the elastic member 13, corresponding parts as to FIGS. 1 to 3 are designated by the same reference numerals. In FIGS. 4 and 5, an upper portion 13a of the elastic member 13 is fixed to a support screw 17 threaded into a front end portion 6a of a spacer 6, while a lower portion 13b is elastically abutted against opposite projections 18 formed on inner walls of a pair of support portions 2a of the arm 2. Fulcrum portions 12 projecting from a base material 4 of a carriage 1 is in contact with a lower surface of the arm 2. One end of a leaf hinge spring 3 is embedded in the arm 2 between the pair of support portions 2a in such a manner as to be separated from the lower portion 13b of the elastic member 13 owing to the existence of the projections 18. The other end of the leaf hinge spring 3 is interposed between the base material 4 of the carriage 1 and the spacer 6, and is fixed by a screw or the like. With this arrangement, a resilient force of the elastic member 13 to the arm 2 may be adjusted by changing an extend of insertion of the support screw 17 into the spacer 6. Further, the rear end portions of the arm 2 are elastically retained by the elastic member 13, and are rotatably supported to the carriage 1 by the fulcrum portions 12. Accordingly, external oscillation may be prevented from being transmitted to the arm 2 owing to the existance of the elastic member 13, thereby preventing off-track during reading and writing and also preventin head noise due to resonance of the arm 2.

Having thus described the preferred embodiment of the invention, it should be understood that numerous structural modifications and adaptations may be made without departing from the spirit of the invention.

What is claimed is:

1. In a magnetic head assembnly including a movable carriage for moving a magnetic head with respect to a magnetic recording medium, a leaf spring hinge having one end portion fixed to said carriage and another end portion connected to a rear portion of an arm for pivotably mounting said arm to said carriage, the improvement comprising:

a fulcrum portion projecting from a first part of said carriage to abut against a lower side of said rear portion of said arm;

an elastic member formed of a leaf spring in a U-shape in side elevation which is interposed between an upper side of said rear portion of said arm and a second part of said carriage opposed to said fulcrum portion of said first part, wherein said rear portion of said arm is pivotably supported on said carriage between said fulcrum portion and said elastic member, said leaf spring having an upper portion fixed by a screw threaded into said second part of said carriage and a lower portion elastically abutted against opposite projections formed on inner walls of said rear portion of said arm.

2. The magnetic head assembly as defined in claim 1, wherein said fulcrum portion has an upper arcuate surface.

3. The magnetic head assembly as defined in claim 1, wherein a resilient force of said elastic member to said arm is adjustable by changing an extent of insertion of said screw into said carriage.

* * * * *